US012658353B2

(12) United States Patent
Murashita et al.

(10) Patent No.: US 12,658,353 B2
(45) Date of Patent: Jun. 16, 2026

(54) REACTOR, CONVERTER, AND POWER CONVERSION DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Masaya Murashita, Mie (JP); Kazuhiro Inaba, Mie (JP); Kohei Yoshikawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 945 days.

(21) Appl. No.: 17/911,978

(22) PCT Filed: Mar. 24, 2021

(86) PCT No.: PCT/JP2021/012435
§ 371 (c)(1),
(2) Date: Sep. 15, 2022

(87) PCT Pub. No.: WO2021/193784
PCT Pub. Date: Sep. 30, 2021

(65) Prior Publication Data
US 2023/0187116 A1 Jun. 15, 2023

(30) Foreign Application Priority Data
Mar. 27, 2020 (JP) ................................ 2020-059196

(51) Int. Cl.
*H01F 27/26* (2006.01)
*H01F 27/255* (2006.01)
*H01F 27/28* (2006.01)

(52) U.S. Cl.
CPC ......... *H01F 27/263* (2013.01); *H01F 27/255* (2013.01); *H01F 27/28* (2013.01)

(58) Field of Classification Search
CPC ...... H01F 27/263; H01F 27/255; H01F 27/28; H01F 3/14; H01F 27/346; H01F 37/00; H02M 3/155
(Continued)

(56) References Cited

U.S. PATENT DOCUMENTS 3,010,185 A * 11/1961 Hume ..................... H01F 38/10
29/609
7,501,925 B2 * 3/2009 Naito .................. C22C 33/0228
336/233
(Continued)

FOREIGN PATENT DOCUMENTS

JP S49-020049 U 2/1974

OTHER PUBLICATIONS

International Search Report issued on Jun. 22, 2021 for WO 2021/193784 A1 (4 pages).

*Primary Examiner* — Tuyen T Nguyen
(74) *Attorney, Agent, or Firm* — Venjuris, P.C.

(57) ABSTRACT

The magnetic core includes a middle core, a first end core, a second end core, a first side core, and a second side core. At least either the first side core or the second side core includes an inward recessed portion provided in an inward face that faces the first winding portion in a Y direction. In a plan view of the magnetic core from a Z direction, at least a portion of the inward recessed portion is overlapped with a range corresponding to the length of the first winding
(Continued)

portion in an X direction. The X direction is a direction conforming to the axial direction of the middle core, the Y direction is a direction in which the middle core, the first side core, and the second side core are side-by-side, and the Z direction is a direction orthogonal to the X direction and the Y direction.

9 Claims, 6 Drawing Sheets

(58) Field of Classification Search
USPC .................................. 336/83, 212, 233–234
See application file for complete search history.

(56) References Cited

U.S. PATENT DOCUMENTS

| | | | |
|---|---|---|---|
| 2018/0122550 | A1 | 5/2018 | Inaba |
| 2021/0020352 | A1 | 1/2021 | Okano et al. |

* cited by examiner

REACTOR, CONVERTER, AND POWER CONVERSION DEVICE

CROSS REFERENCE TO RELATED APPLICATIONS

This application is a national phase of PCT application No. PCT/JP2021/012435, filed on 24 Mar. 2021, which claims priority from Japanese patent application No. 2020-059196, filed on 27 Mar. 2020, all of which are incorporated herein by reference.

TECHNICAL FIELD

The present disclosure relates to a reactor, a converter, and a power conversion device.

BACKGROUND

A reactor is a constituent component of a converter provided in a hybrid automobile or the like. Such a reactor includes a coil having a winding portion formed by winding a wire into a spiral, and a magnetic core combined with the coil. For example, a reactor that has one winding portion is disclosed in FIGS. 5 to 8 of Patent Document 1. The magnetic core of this reactor includes a middle core arranged inside the winding portion, side cores arranged outward of outer peripheral faces of the winding portion, and end cores arranged at end faces of the winding portion.

PRIOR ART DOCUMENT

Patent Document

Patent Document 1: JP 2016-201509 A

SUMMARY OF INVENTION

A reactor according to the present disclosure includes:
a coil including a first winding portion; and
a magnetic core,
wherein the magnetic core includes:
- a middle core arranged inside the first winding portion,
- a first end core facing a first end face of the first winding portion,
- a second end core facing a second end face of the first winding portion,
- a first side core that is arranged outward of a first side face of the first winding portion and connects the first end core and the second end core, and
- a second side core that is arranged outward of a second side face of the first winding portion and connects the first end core and the second end core, at least one of the first side core and the second side core includes an inward recessed portion provided in an inward face that faces the first winding portion in a Y direction,
in a plan view of the magnetic core from a Z direction, at least a portion of the inward recessed portion is overlapped with a range corresponding to the length of the first winding portion in an X direction,
the X direction is a direction conforming to an axial direction of the middle core,
the Y direction is a direction in which the middle core, the first side core, and the second side core are side-by-side, and
the Z direction is a direction orthogonal to the X direction and the Y direction.

A converter according to the present disclosure includes:
the reactor of the present disclosure.

A power conversion device according to the present disclosure includes:
the converter of the present disclosure.

DETAILED DESCRIPTION TO EXECUTE THE INVENTION

Technical Problem

Figure 1:
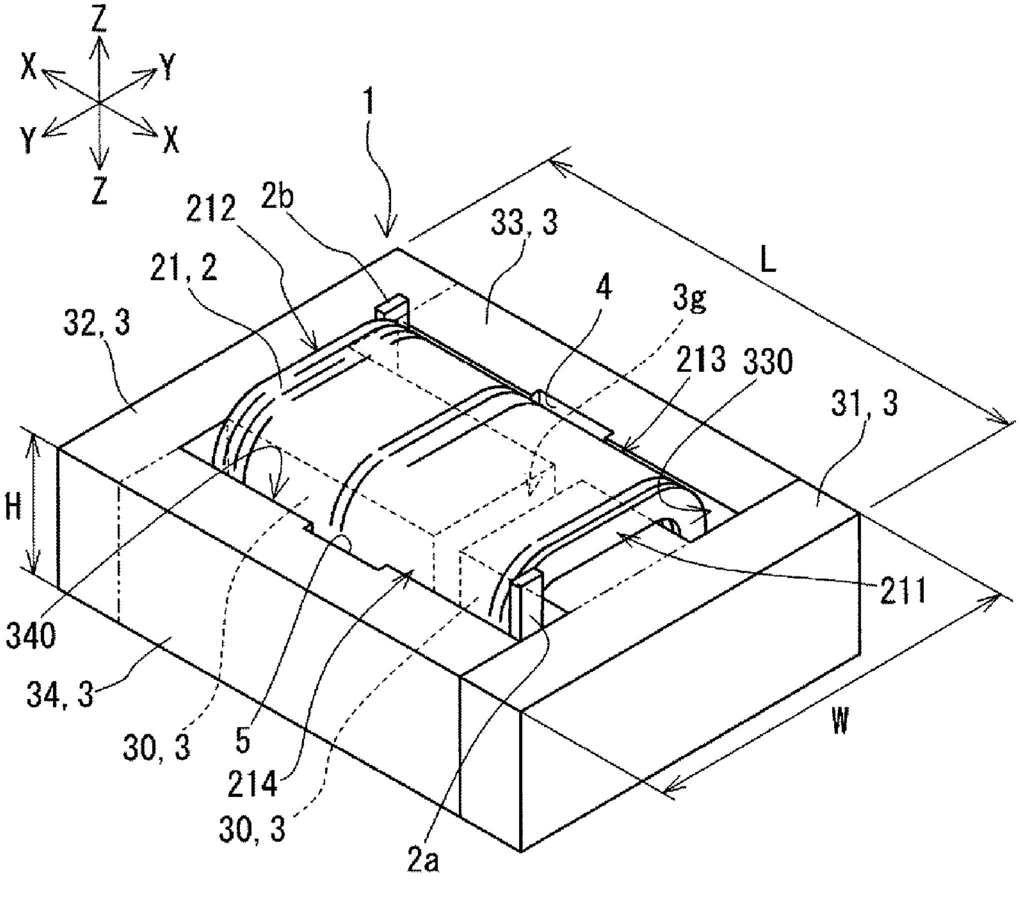
FIG. 1 is a schematic perspective view of a reactor according to a first embodiment.

Development in hybrid automobiles and the like has led to demand for reduction in the weight of reactors. However, if the size of the magnetic core is reduced in order to reduce the weight of a reactor, magnetic characteristics of the reactor deteriorate.

In view of this, an object of the present disclosure is to provide a reactor that is lightweight and has excellent magnetic characteristics. Another object of the present disclosure is to provide a converter that includes a reactor that is lightweight and has excellent magnetic characteristics, and a power conversion device.

Advantageous Effects of Present Disclosure

The reactor of the present disclosure is lightweight and has excellent magnetic characteristics. Also, the converter and the power conversion device of the present disclosure are lightweight and excellent in terms of conversion efficiency.

Description of Embodiments of Present Disclosure

First, embodiments of the present disclosure will be listed and described.

<1> A reactor according to an embodiment includes:
a coil including a first winding portion; and
a magnetic core,
wherein the magnetic core includes:
- a middle core arranged inside the first winding portion,
- a first end core facing a first end face of the first winding portion,
- a second end core facing a second end face of the first winding portion, a first side core that is arranged outward of a first side face of the first winding portion and connects the first end core and the second end core, and a second side core that is arranged outward of a second side face of the first winding portion and connects the first end core and the second end core, at least one of the first side core and the second side core includes an inward recessed portion provided in an inward face that faces the first winding portion in a Y direction, in a plan view of the magnetic core from a Z direction, at least a portion of the inward recessed portion is overlapped with a range corresponding to the length of the first winding portion in an X direction, the X direction is a direction conforming to an axial direction of the middle core, the Y direction is a direction in which the middle core, the first side core, and the second side core are side-by-side, and the Z direction is a direction orthogonal to the X direction and the Y direction.

Here, the first side core may be provided with one inward recessed portion or a plurality of inward recessed portions. Similarly, the second side core may be provided with one inward recessed portion or a plurality of inward recessed portions.

Due to providing the inward recessed portion in at least either the first side core or the second side core, the amount of material constituting the side cores decreases, thus suppressing the weight of the magnetic core, that is to say the weight of the reactor.

If the inward recessed portion is provided in the inward faces of the side cores that face the first winding portion, the magnetic flux flowing through the side cores meanders in a direction away from the first winding portion. Although the sectional area of the magnetic path of the side cores decreases due to the inward recessed portions, the leakage of magnetic flux from the side cores to the coil is reduced. For this reason, coil loss that occurs in the coil is reduced, and therefore even if the sectional area of the magnetic path of the side cores decreases due to the inward recessed portions, deterioration of the magnetic characteristics of the reactor is suppressed.

If the inward recessed portion is provided in both of the side cores, coil loss is not likely to increase even if the side cores are arranged at a positions near the first winding portion. Accordingly, the size of the reactor in the Y direction is reduced by arranging the side cores at positions near the first winding portion. In contrast with the reactor of this aspect, in a conventional reactor not including the inward recessed portions, if the side cores are arranged at positions distant from the first winding portion in order to reduce coil loss, the size of the reactor in the Y direction increases.

<2> In one aspect of the reactor according to the embodiment, the first side core and the second side core each include the inward recessed portion.

Due to providing the inward recessed portion in both the first side core and the second side core, the weight of the magnetic core is significantly reduced.

<3> In one aspect of the reactor according to the embodiment, in a plan view of the magnetic core from the Z direction, the inward recessed portion fits in the range corresponding to the length of the first winding portion in the X direction.

Since the leakage of magnetic flux to the first winding portion decreases at the position of the inward recessed portion, if a portion of the inward recessed portion is arranged outside the range corresponding to the length of the first winding portion in order to reduce, the portion outside that range is not likely to contribute to coil loss. On the other hand, if the width of the inward recessed portion fits within the range corresponding to the length of the first winding portion as in the above configuration, it is possible to easily obtain an effect of reducing coil loss due to the provision of the inward recessed portion.

<4> In one aspect of the reactor according to the embodiment, the inward recessed portion is shaped as a groove extending along the Z direction.

If the inward recessed portion is shaped as a groove that extends in the Z direction, the volume of the side core that is reduced can be increased by increasing the length of the inward recessed portion in the Z direction. As the length of the inward recessed portion in the Z direction increases, the size of the area in which the inward recessed portion faces the first winding portion increases. For this reason, the amount of magnetic flux that leaks from the side cores to the first winding portion is reduced, and coil loss in the reactor is likely to be reduced.

<5> In one aspect of the reactor according to the embodiment, a cross-section of the inward recessed portion orthogonal to the Z direction has a rectangular shape.

It is easy to form an inward recessed portion having a rectangular or trapezoidal cross-sectional shape. Also, if the cross-sectional shape of the inward recessed portion is rectangular or trapezoidal, the volume of the side cores can be significantly lower than in the case where the inward recessed portion has a semicircular cross-sectional shape or the like. If the volume reduction amount of the side cores is large, the weight of the magnetic core is likely to be reduced.

<6> In one aspect of the reactor according to the embodiment, the first side core and the second side core are each a compact made of a composite material in which a soft magnetic powder is dispersed in a resin.

If the side cores that include the inward recessed portion are compacts made of a composite material, deterioration of the magnetic characteristics of the magnetic core can be suppressed more easily than in the case where the side cores are powder compacts. Grounds for this are found in the results of Test Example 2 described later.

<7> In one aspect of the reactor according to the embodiment, in a plan view of the magnetic core from the Z direction, the width of the inward recessed portion in the X direction is 5% or more and 70% or less of the length of the first winding portion in an axial direction.

Here, if a plurality of inward recessed portions are provided in each of the side cores, the sum of the widths of the inward recessed portions provided in each side core is 5% or more and 70% or less of the length of the first winding portion in the axial direction.

If the width of the inward recessed portion in the X direction is 5% or more and 70% or less of the length of the first winding portion in the axial direction, the weight of the magnetic core is significantly reduced without significant deterioration of the magnetic characteristics of the reactor. Grounds for this are found in the results of Test Example 1 described later.

<8> In one aspect of the reactor according to the embodiment, in a plan view of the magnetic core from the Z direction, the depth of the inward recessed portion in the Y direction is 5% or more and 50% or less of the length of the at least one side core that includes the inward recessed portion in the Y direction.

If the Y-direction depths of the inward recessed portions of the side cores are 5% or more and 50% or less of the lengths of the side cores in the Y direction, it is possible to suppress excessive reduction of the sectional areas of the magnetic paths of the side cores. For this reason, the magnetic characteristics of the reactor are not likely to deteriorate.

<9> A converter according to an embodiment includes: the reactor according to any of aspects <1> to <8>.

The above converter includes a reactor that is lightweight and has excellent magnetic characteristics. Accordingly, the converter is lightweight and has excellent conversion efficiency.

<10> A power conversion device according to an embodiment includes:

the converter according to aspect <9>.

The above power conversion device includes a converter that is lightweight and has excellent conversion efficiency. Accordingly, the power conversion device is lightweight and has excellent conversion efficiency.

Details of Embodiments of Present Disclosure

Hereinafter, embodiments of a reactor according to the present disclosure will be described with reference to the drawings. Like reference numerals in the figures indicate members having like names. It should be noted that the present invention is not limited to the configurations shown in the embodiments, but rather is indicated by the scope of claims, and is intended to include all modifications within a meaning and scope equivalent to the scope of claims.

First Embodiment

The configuration of a reactor 1 will be described in a first embodiment with reference to FIGS. 1 and 2. The reactor 1 shown in FIG. 1 is obtained by combining a coil 2 and a magnetic core 3. One of the features of the reactor 1 is that an inward recessed portion 4 is provided in a portion of the magnetic core 3. Hereinafter, configurations provided in the reactor 1 will be described in detail.

1. Coil

Figure 2:
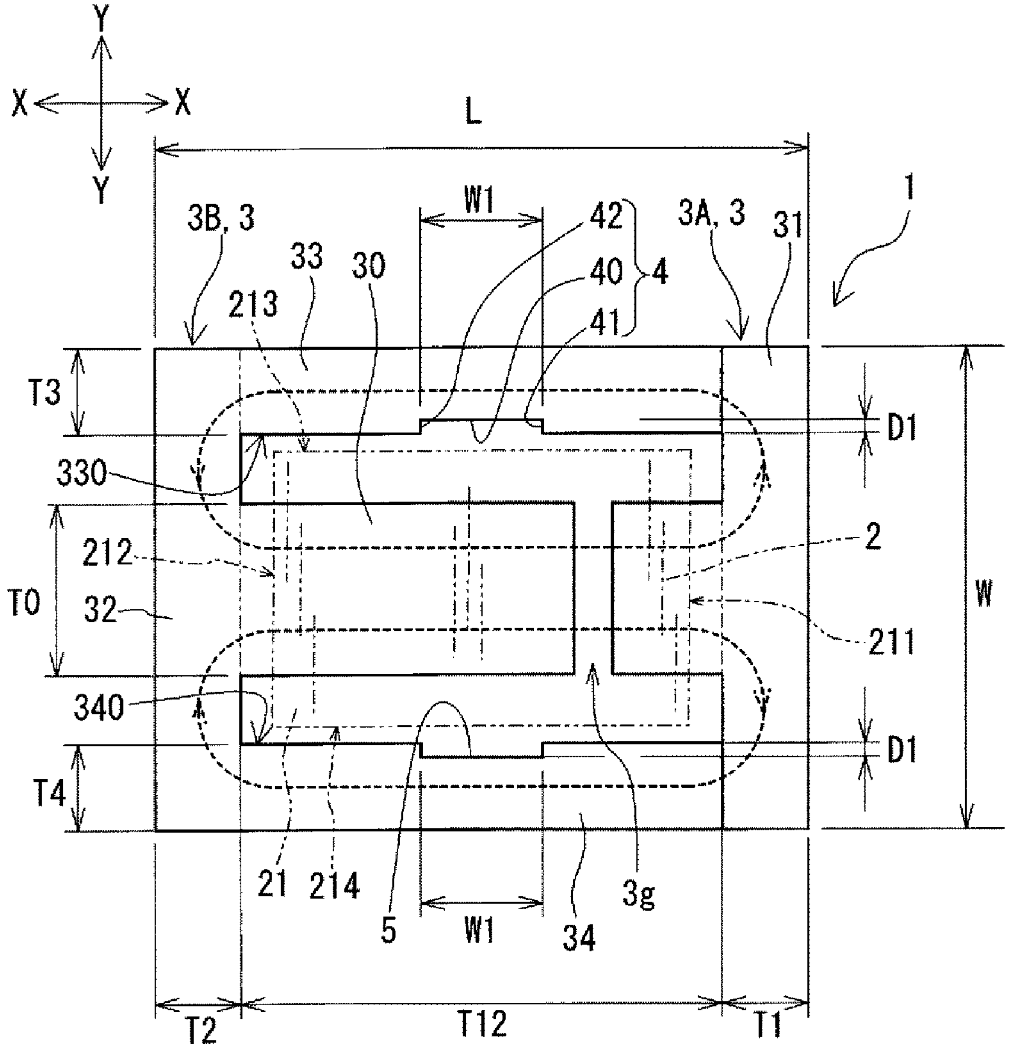
FIG. 2 is a top view of the reactor of FIG. 1.

The coil includes one first winding portion 21 (FIGS. 1 and 2). The first winding portion 21 is constituted by one jointless coil wire that has been wound into a spiral. A known coil wire can be used as the coil wire. A covered flat wire is used as the coil wire in this embodiment. The conductor wire of the covered flat wire is constituted by a copper flat wire. The insulating coating of the covered flat wire is made of an enamel. The first winding portion 21 is constituted by an edgewise coil in which a covered flat wire has been wound edgewise.

The first winding portion 21 is shaped as a rectangular cylinder. The term "rectangular" includes a square. In other words, the end faces of the first winding portion 21 are shaped as a rectangular frame. Due to the first winding portion 21 being shaped as a rectangular cylinder, the area of contact between the first winding portion 21 and the installation target is likely to be larger than in the case where the winding portion is shaped as a cylinder having the same cross-sectional area. For this reason, heat generated by the reactor 1 can be easily dissipated to the installation target via the first winding portion 21. Moreover, the first winding portion 21 can be easily disposed stably on the installation target. The winding portion 21 has rounded corner portions.

An end portion 2*a* and an end portion 2*b* of the first winding portion 21 extend circumferentially outward from the first winding portion 21 on one end side and the other end side, respectively, in the axial direction of the first winding portion 21. At the end portion 2*a* and the end portion 2*b* of the first winding portion 21, the insulating coating has been peeled off to expose the conductor wire. A terminal member (not shown) is connected to each of the exposed portions of the conductor wire. An external device is connected to the coil 2 via the terminal members. The external device is not shown in the drawings. One example of the external device is a power source that supplies electric power to the coil 2.

2. Magnetic Core

As shown in FIG. 2, the magnetic core 3 includes a middle core 30, a first end core 31, a second end core 32, a first side core 33, and a second side core 34. In FIG. 2, the boundaries of the cores 30, 31, 32, 33, and 34 are shown by dashed double-dotted lines. The middle core 30 is a section of the magnetic core 3 that has a portion arranged inside the first winding portion 21. The first end core 31 is a portion of the magnetic core 3 that faces a first end face 211 of the first winding portion 21. The second end core 32 is a portion of the magnetic core 3 that faces a second end face 212 of the first winding portion 21. The first side core 33 is a portion of the magnetic core 3 that is arranged outward of a first side face 213 of the first winding portion 21. The second side core 34 is a portion of the magnetic core 3 that is arranged outward of a second side face 214 of the first winding portion 21.

In the magnetic core 3, an annular closed magnetic path shown by a bold dashed line is formed in the middle core 30, the first end core 31, the first side core 33, and the second end core 32. Also, an annular closed magnetic path shown by a bold dashed line is formed in the middle core 30, the first end core 31, the second side core 34, and the second end core 32.

Here, directions in the reactor 1 are defined based on the magnetic core 3. First, the direction along the axial direction of the middle core 30 is an X direction. A direction that is orthogonal to the X direction and is the direction in which the middle core 30, the first side core 33, and the second side core 34 are side-by-side is a Y direction. A direction that intersects both the X direction and the Y direction is a Z direction (FIG. 1).

2.1. Middle Core

The middle core 30 is a portion of the magnetic core 3 that is arranged inside the first winding portion 21 of the coil 2. Accordingly, the middle core 30 extends along the axial direction of the first winding portion 21. In this example, the two end portions of the magnetic core 3 along the axial direction of the first winding portion 21 respectively project from the end faces 211 and 212 of the first winding portion 21. The protruding portions are also portions of the middle core 30.

The shape of the middle core 30 is not particularly limited as long as it conforms to the shape of the interior of the first winding portion 21. The middle core 30 of this example has a substantially rectangular parallelepiped shape.

2.2. First End Core and Second End Core

The first end core 31 and the second end core 32 have a larger width in the Y direction than the first winding portion 21. Specifically, the first end core 31 projects outward in the Y direction from the first end face 211 of the first winding portion 21, and the second end core 32 projects outward in the Y direction from the second end face 212 of the first winding portion 21.

The shapes of the first end core 31 and the second end core 32 are not particularly limited as long as sufficient magnetic paths are formed inside the end cores 31 and 32. The first end core 31 and the second end core 32 of this example have a substantially rectangular parallelepiped shape. Among the four corner portions of the first end core 31 and the second end core 32 in a view from the Z direction, the two corner portions that are distant from the side cores 33 and 34 may be rounded. If these two corner portions are rounded, the weight of the end cores 31 and 32 is lowered. These two corner portions are portions where magnetic flux is not likely to flow. Therefore, even if these two corner portions are rounded, the magnetic characteristics of the reactor 1 are not likely to deteriorate.

2.3. First Side Core and Second Side Core

The first side core 33 connects the first end core 31 and the second end core 32 at a position outward of the first side face 213 of the first winding portion 21. The axial direction of the first side core 33 is parallel with the axial direction of the middle core 30. The first side face 213 is a face of the first winding portion 21 that faces the Y direction.

The second side core 34 connects the first end core 31 and the second end core 32 at a position outward of the second side face 214 of the first winding portion 21. The second side face 214 is a face of the first winding portion 21 that faces the Y direction, but faces the side opposite to the first side face 213. The axial direction of the second side core 34 is parallel with the axial direction of the middle core 30. In this example, the axis of the middle core 30, the axis of the first side core 33, and the axis of the second side core 34 are arranged on the XY plane.

An inward recessed portion 4 is provided in an inward face 330 of the first side core 33 of this example. The inward face 330 is the face of the first side core 33 that faces the first side face 213 of the first winding portion 21. Also, an inward recessed portion 5 is provided in an inward face 340 of the second side core 34 of this example. The inward face 340 is the face of the second side core 34 that faces the second side face 214 of the first winding portion 21. The weights of the side cores 33 and 34 are reduced due to the inward recessed portions 4 and 5. The inward recessed portions 4 and 5 will be described in detail later.

2.4. Division

The magnetic core 3 is constituted by a plurality of core pieces so as to enable attachment to the coil 2. The magnetic core 3 in this example is a combination of two core pieces, namely a first core piece 3A and a second core piece 3B. The first core piece 3A is constituted by the first end core 31 and a portion of the middle core 30. The first core piece 3A is approximately T-shaped in a view from the Z direction. On the other hand, the second core piece 3B is constituted by the second end core 32, the first side core 33, the second side core 34, and a portion of the middle core 30. The second core piece 3B is approximately E-shaped in a view from the Z direction. Here, the magnetic core 3 may be divided into three or more pieces as shown in a second embodiment, for example.

The sum of the X direction length of the portion of the first core piece 3A corresponding to the middle core 30 and the X direction length of the portion of the second core piece 3B corresponding to the middle core 30 is shorter than the X direction length of the first side core 33 and the X direction length of the second side core 34. Accordingly, a gap portion 3*g* is formed between the first core piece 3A and the second core piece 3B inside the first winding portion 21. The gap portion 3*g* in this example is an air gap. A gap plate (not shown) may be arranged in the gap portion 3*g*. In contrast to this example, the end face of the first core piece 3A and the end face of the second core piece 3B may be in contact with each other inside the first winding portion 21. In this case, a gap portion may be provided at least either between the first end core 31 and the first side core 33 or between the first end core 31 and the second side core 34.

2.5. Magnetic Characteristics, Materials, Etc.

It is preferable that the cores 30, 31, 32, 33, and 34 of the magnetic core 3 are each a powder compact formed by pressure molding a raw material powder containing a soft magnetic powder, or a compact made of a composite material including a soft magnetic powder and a resin. All of the cores 30, 31, 32, 33, and 34 may be powder compacts, or all of the cores 30, 31, 32, 33, and 34 may be composite material compacts. Also, a configuration is possible in which some of the cores 30, 31, 32, 33, and 34, are powder compacts and the rest are composite material compacts. In the case where some of the cores are powder compacts and the rest are composite material compacts, the magnetic core 3 has resistance to magnetic saturation.

The soft magnetic powder of the powder compact is an aggregate of soft magnetic particles constituted by an iron group metal such as iron, or an iron alloy such as an Fe—Si (iron-silicon) alloy or an Fe—Ni (nickel) alloy. An insulating coating made of phosphate or the like may be formed on the surfaces of the soft magnetic particles. The raw material powder may contain a lubricant or the like.

The composite material compact can be produced by filling a mold with a mixture of a soft magnetic powder and an unsolidified resin, and then solidifying the resin. The soft magnetic powder contained in the composite material can be the same as that used in the powder compact. Also, examples of the resin contained in the composite material include a thermosetting resin, a thermoplastic resin, a room temperature curing resin, and a low temperature curing resin. Examples of thermosetting resins include unsaturated polyester resin, epoxy resin, urethane resin, and silicone resin. Examples of thermoplastic resins include polyphenylene sulfide (PPS) resin, polytetrafluoroethylene (PTFE) resin, liquid crystal polymer (LCP), a polyamide (PA) resin such as nylon 6 or nylon 66, polybutylene terephthalate (PBT) resin, and acrylonitrile butadiene styrene (ABS) resin. It is also possible to use millable silicone rubber, millable urethane rubber, or a BMC (Bulk Molding Compound), which is obtained by adding calcium carbonate and glass fiber to unsaturated polyester, for example.

If the composite material contains a non-magnetic and non-metallic powder (filler) made of alumina, silica, or the like in addition to the soft magnetic powder and the resin, the heat dissipation characteristic can be further improved. The content of the non-magnetic and non-metal powder is 0.2% by mass or more and 20% by mass or less, 0.3% by mass or more and 15% by mass or less, or 0.5% by mass or more and 10% by mass or less, for example.

The content of the soft magnetic powder in the composite material is 30% by volume or more and 80% by volume or less, for example. From the viewpoint of improving saturation magnetic flux density and heat dissipation, the content of the magnetic powder can also be set to 50% by volume or more, 60% by volume or more, or 70% by volume or more. From the viewpoint of improving fluidity in the manufacturing process, it is preferable that the content of the magnetic powder is 75% by volume or less. The relative magnetic permeability of the composite material compact can be easily reduced by lowering the filling rate of the soft magnetic powder. The relative magnetic permeability of the composite material compact is 5 or more and 50 or less, for example. The relative magnetic permeability of the composite material compact may also be 10 or more and 45 or less, 15 or more and 40 or less, or 20 or more and 35 or less. In this example, the second core piece 3B that includes the inward recessed portions 4 and 5 is entirely constituted by a composite material compact.

A powder compact has a higher content of soft magnetic powder than a composite material compact. For example, the content of soft magnetic powder in a powder compact is over 80% by volume, or 85% by volume or more. A core piece made of a powder compact tends to have a high saturation magnetic flux density and a high relative magnetic permeability. The powder compact has a relative magnetic permeability of 50 or more and 500 or less, for example. The powder compact may have a relative magnetic permeability of 80 or more, 100 or more, 150 or more, or 180 or more. In this example, the entirety of the first core piece 3A is constituted by a powder compact.

2.6. Size

When the reactor 1 in this example is for in-vehicle use, a length L of the magnetic core 3 in the X direction is 30 mm or more and 150 mm or less, for example, a width W of the magnetic core 3 in the Y direction is 30 mm or more and 150 mm or less, for example, and a height H in the Z direction is 15 mm or more and 75 mm or less, for example.

A length T0 of the middle core 30 in the Y direction is 10 mm or more and 50 mm or less, for example. A length T1 of the first end core 31 in the X direction and a length T2 of the second end core 32 in the X direction are 5 mm or more and 40 mm or less, for example. Also, a length T3 of the first side core 33 in the Y direction and a length T4 of the second side core 34 in the Y direction are 5 mm or more and 40 mm or less, for example. These lengths are related to the magnitude of the sectional area of the magnetic path of the magnetic core 3. A length T12 of the middle core 30 in the X direction is the result of subtracting the length T1 and the length T2 from the length L of the magnetic core 3, and is 10 mm or more and 140 mm or less, for example.

3. Inward Recessed Portion of First Side Core

The inward face 330 of the first side core 33 includes the inward recessed portion 4. There may be one inward recessed portion 4 as illustrated in the drawings, or a plurality may be provided. In a plan view of the magnetic core 3 from the Z direction, at least a portion of the inward recessed portion 4 is overlapped with a range corresponding to the length T12 of the first winding portion 21 in the X direction. If the inward recessed portion 4 is provided in the inward face 330 of the first side core 33 that faces the first winding portion 21, the magnetic flux flowing through the first side core 33 meanders in a direction away from the first winding portion 21. Although the sectional area of the magnetic path of the first side core 33 decreases due to the inward recessed portion 4, the leakage of magnetic flux from the first side core 33 to the coil 2 is reduced. For this reason, coil loss that occurs in the coil 2 is reduced, and therefore even if the sectional area of the magnetic path of the first side core 33 decreases due to the inward recessed portion 4, deterioration of the magnetic characteristics of the reactor 1 is suppressed.

Here, since the leakage of magnetic flux to the first winding portion 21 decreases at the position of the inward recessed portion 4, if a portion of the inward recessed portion 4 is outside the range corresponding to the length T12 of the first winding portion 21, the portion outside the range is unlikely to contribute to the reduction of coil loss. Accordingly, it is preferable that the inward recessed portion 4 fits within a range corresponding to the length T12 of the first winding portion 21 in the X direction. If the width W1 of the inward recessed portion 4 is within a range corresponding to the length T12 of the first winding portion 21, it is possible to easily obtain an effect of reducing coil loss due to the provision of the inward recessed portion 4.

It is preferable that the inward recessed portion 4 is shaped as a groove that extends in the Z direction. The inward recessed portion 4 in this example has a length extending from the upper face of the first side core 33 to the lower face of the same in the Z direction. If the inward recessed portion 4 has such a length, the effect of reducing the weight of the first side core 33 is improved. In contrast to this example, a configuration is possible in which the inward recessed portion 4 does not reach the upper face or the lower face of the first side core 33.

There are no particular limitations on the shape of a cross-section of the inward recessed portion 4 orthogonal to the extending direction thereof. In this example, the shape of a cross-section of the inward recessed portion 4 orthogonal to the extending direction thereof is rectangular, and this cross-sectional shape is a shape defined by a bottom face 40 of the inward recessed portion 4, two inner wall faces 41 and 42 of the same that face each other in the X direction, and the opening on the outer side in the Y direction. The corners of the rectangle may be rounded. If the cross-sectional shape of the inward recessed portion 4 is rectangular, the volume of the first side core 33 can be significantly lower than in the case where the inward recessed portion has a semicircular or triangular cross-sectional shape, for example. In contrast to this example, the cross-sectional shape of the inward recessed portion 4 may be a trapezoid that has a wide opening. In other words, if the inward recessed portion 4 has a trapezoidal cross-sectional shape, the distance between the inner wall face 41 and the inner wall face 42 of the inward recessed portion 4 increases from the bottom face 40 toward the opening. The corners of the trapezoid may be rounded. Even in the case of having a trapezoidal cross-sectional shape, the inward recessed portion 4 can reduce the volume of the first side core 33 more than in the case where the inward recessed portion has a semicircular or triangular cross-sectional shape, for example.

It is preferable that the width W1 of the inward recessed portion 4 in the X direction is preferably 5% or more and 70% or less of the length T12 of the middle core 30 in the X direction. It is more preferable that the width W1 is 10% or more and 55% or less of the length T12. If a plurality of inward recessed portions 4 are provided in the first side core 33, the sum of the widths of the inward recessed portions 4 in the first side core 33 serves as the width W1 in the X direction. If the width W1 of the inward recessed portion 4 in the X direction is 5% or more and 70% or less of the length T12 of the first winding portion 21 in the X direction, the weight of the magnetic core 3 is greatly reduced without significant deterioration of the magnetic characteristics of the reactor 1. Here, the width W1 of the inward recessed portion 4 is the width of the opening of the inward recessed portion 4.

On the other hand, it is preferable that the depth D1 of the inward recessed portion 4 in the Y direction is 5% or more and 50% or less of the length T3 of the first side core 33 in the Y direction. It is more preferable that the depth D1 is 10% or more and 35% or less of the length T3. If the depth D1 of the inward recessed portion 4 in the first side core 33 is in the above range, it is possible to suppress excessive reduction of the sectional area of the magnetic path of the first side core 33. Accordingly, the magnetic characteristics of the reactor 1 are not likely to deteriorate. Here, the depth D1 of the inward recessed portion 4 is the length from the opening of the inward recessed portion 4 to the deepest portion.

4. Inward Recessed Portion of Second Side Core

The configuration of an inward recessed portion 5 provided in the second side core 34 is the same as the configuration of the inward recessed portion 4 provided in the first side core 33. A description of the inward recessed portion 5 can be obtained from the description of the inward recessed portion 4 by replacing "inward recessed portion 4" with "inward recessed portion 5", replacing "first side core 33" with "second side core 34", and replacing "length T3" with "length T4".

5. Other Examples

The magnetic core 3 of the reactor 1 may be configured to include only the inward recessed portion 4 provided in the first side core 33, or may be configured to include only the inward recessed portion 5 provided in the second side core 34.

6. Other Remarks

The reactor 1 may further include at least one component among a case, an adhesive layer, a holding member, and a molded resin portion. The case is a member that houses the assembly of the coil 2 and the magnetic core 3. The assembly housed in the case may be embedded in a sealing resin portion. The adhesive layer fixes the assembly to a mounting face, fixes the assembly to the inner bottom face of the case, or fixes the case to a mounting face. The holding member is a member interposed between the coil 2 and the magnetic core 3 to ensure insulation between the coil 2 and the magnetic core 3. The molded resin portion surrounds the assembly and is interposed between the coil 2 and the magnetic core 3 to integrate the coil 2 and the magnetic core 3.

7. Effects

The reactor 1 of this example, which includes the inward recessed portions 4 and 5, is lighter than a conventional reactor that does not include the inward recessed portions 4 and 5.

In the reactor 1 of this example, the inward recessed portion 4 is provided in the first side core 33, and the inward recessed portion 5 is provided in the second side core 34, thus reducing the amount of material that constitutes the two side cores 33 and 34. This therefore reduces the weight of the reactor 1. Also, since the amount of material constituting the two side cores 33 and 34 is reduced, the productivity of the magnetic core 3, including the cost, is improved, or in other words the productivity of the reactor 1 is improved.

The reactor 1 of this example has magnetic characteristics approximately the same as those of a reactor not including the inward recessed portions 4 and 5.

In the reactor 1 of this example, the inward recessed portion 4 is provided in the inward face 330 of the first side core 33, and the inward recessed portion 5 is provided in the inward face 340 of the second side core 34. These inward recessed portions 4 and 5 reduce the leakage of magnetic flux from the two side cores 33 and 34 to the first winding portion 21. This therefore reduces coil loss that occurs due to leaked magnetic flux passing through the first winding portion 21, thus suppressing deterioration of the magnetic characteristics of the reactor 1.

Second Embodiment

Figure 3:
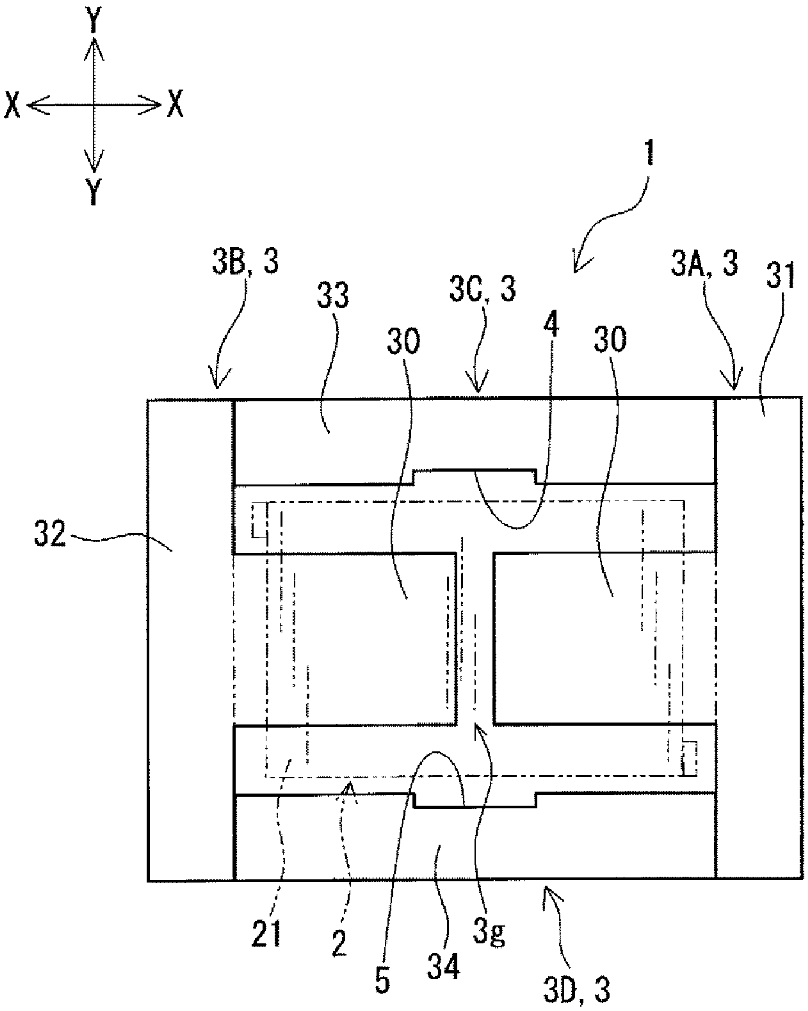
FIG. 3 is a top view of a reactor described in a second embodiment.

A reactor 1 according to a second embodiment will be described below with reference to FIG. 3. The magnetic core 3 of the reactor 1 of the second embodiment is divided differently from that of the reactor 1 of the first embodiment. Besides how the magnetic core 3 is divided, the configuration of the reactor 1 in this example is the same as that of the reactor of the first embodiment.

The magnetic core 3 of the reactor 1 in this example is a combination of a first core piece 3A, a second core piece 3B, a third core piece 3C, and a fourth core piece 3D. The first core piece 3A in this example is constituted by a first end core 31 and a portion of the middle core 30. The second core piece 3B in this example is constituted by a second end core 32 and a portion of the middle core 30. The first core piece 3A and the second core piece 3B are approximately T-shaped in a view from the Z direction. The first core piece 3A and the second core piece 3B in this example have the same shape and are manufactured by one mold.

On the other hand, the third core piece 3C in this example is constituted by the first side core 33, and the fourth core piece 3D in this example is constituted by the second side core 34. The first side core 33 includes the inward recessed portion 4, and the second side core 34 includes the inward recessed portion 5. The third core piece 3C and the fourth core piece 3D are approximately I-shaped in a view from the Z direction. The third core piece 3C and the fourth core piece 3D in this example have the same shape and are manufactured by one mold.

The core pieces 3A, 3B, 3C, and 3D are each a powder compact or a composite material compact. For example, the core pieces 3A and 3B are powder compacts, and the core pieces 3C and 3D are composite material compacts.

The reactor 1 in this example has effects similar to those of the reactor 1 of the first embodiment. In other words, the reactor 1 in this example is lightweight and has excellent magnetic characteristics.

Third Embodiment

Figure 4:
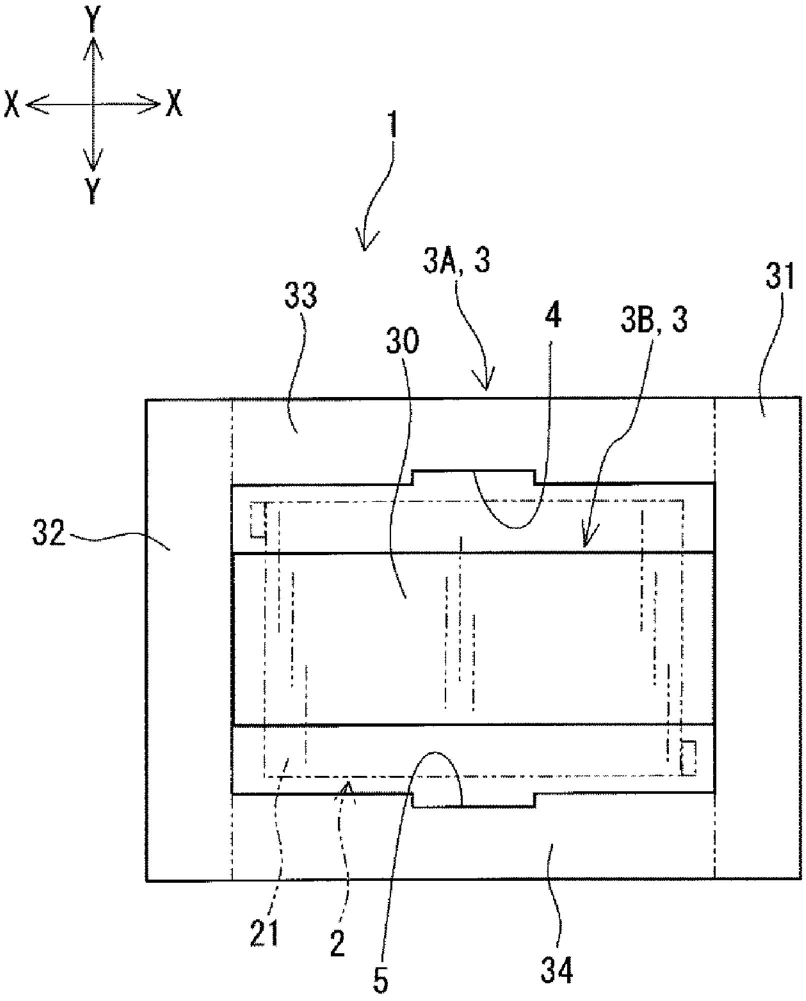
FIG. 4 is a top view of a reactor described in a third embodiment.

A reactor 1 according to a third embodiment will be described below with reference to FIG. 4. The magnetic core 3 of the reactor 1 of the third embodiment is divided differently from that of the reactor 1 of the first and second embodiments. Besides how the magnetic core 3 is divided, the configuration of the reactor 1 in this example is the same as that of the reactor 1 of the first and second embodiments.

The magnetic core 3 of the reactor 1 in this example is a combination of a first core piece 3A and a second core piece 3B. The first core piece 3A in this example is constituted by a first end core 31, a second end core 32, a first side core 33, and a second side core 34. The first side core 33 includes the inward recessed portion 4, and the second side core 34 includes the inward recessed portion 5. The first core piece 3A is approximately O-shaped in a view from the Z direction. On the other hand, the second core piece 3B in this example is constituted by the middle core 30. The second core piece 3B is approximately I-shaped in a view from the Z direction.

The core pieces 3A and 3B are each a powder compact or a composite material compact. For example, the first core piece 3A is a compact made of a composite material, and the second core piece 3B is a powder compact.

The reactor 1 in this example has effects similar to those of the reactor 1 of the first embodiment. In other words, the reactor 1 in this example is lightweight and has excellent magnetic characteristics.

Fourth Embodiment

Converter and Power Conversion Device

The reactor 1 according to the first to third embodiments can be used for applications that satisfy the following power conduction conditions. The power conduction conditions include, for example, that the maximum direct current is 100 A or more and 1000 A or less, the average voltage is 100 V or more and 1000 V or less, and the operating frequency is 5 kHz or more and 100 kHz or less. The reactor 1 according to the first to third embodiments can be typically used as a component of a converter mounted in a vehicle such as an electric automobile or a hybrid automobile, or a component of a power conversion device that includes the converter.

Figure 5:
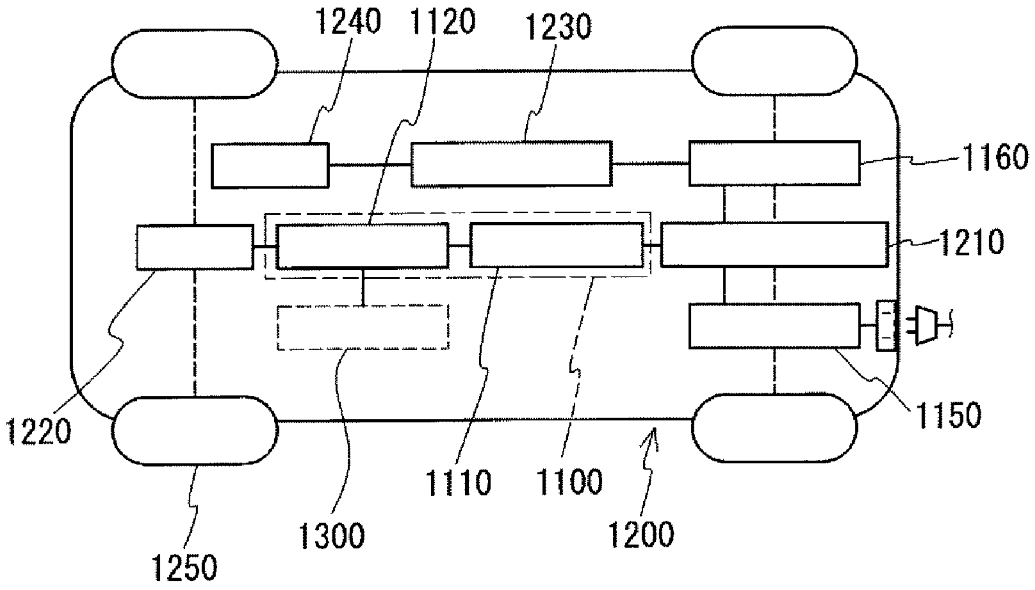
FIG. 5 is a configuration diagram schematically showing a power supply system of a hybrid automobile.

As shown in FIG. 5, a vehicle 1200 such as a hybrid automobile or an electric automobile includes a main battery 1210, a power conversion device 1100 connected to the main battery 1210, and a motor 1220 that is used for traveling and is driven by power supplied from the main battery 1210. The motor 1220 is typically a three-phase AC motor that drives wheels 1250 during travel, and functions as a generator during regeneration. In the case of a hybrid automobile, the vehicle 1200 includes an engine 1300 in addition to a motor 1220. The vehicle 1200 in FIG. 5 includes an inlet as a charging point, but can include a plug instead.

The power conversion device 1100 includes a converter 1110 connected to the main battery 1210, and an inverter 1120 that is connected to the converter 1110 and performs conversion between direct current and alternating current. During traveling of the vehicle 1200, the converter 1110 shown in this example steps up the input voltage from the main battery 1210, which is about 200 V or more and 300 V or less, to about 400 V or more and 700 V or less, and supplies the boosted power to the inverter 1120. During regeneration, the converter 1110 steps down the input voltage output from the motor 1220 via the inverter 1120 to a DC voltage suitable for the main battery 1210, and charges the main battery 1210. The input voltage is DC voltage. During traveling of the vehicle 1200, the inverter 1120 converts the DC voltage boosted by the converter 1110 into a predetermined AC voltage and supplies the power to the motor 1220, whereas during regeneration, the inverter 1120 converts AC voltage output from the motor 1220 into DC voltage and outputs the power to the converter 1110.

Figure 6:
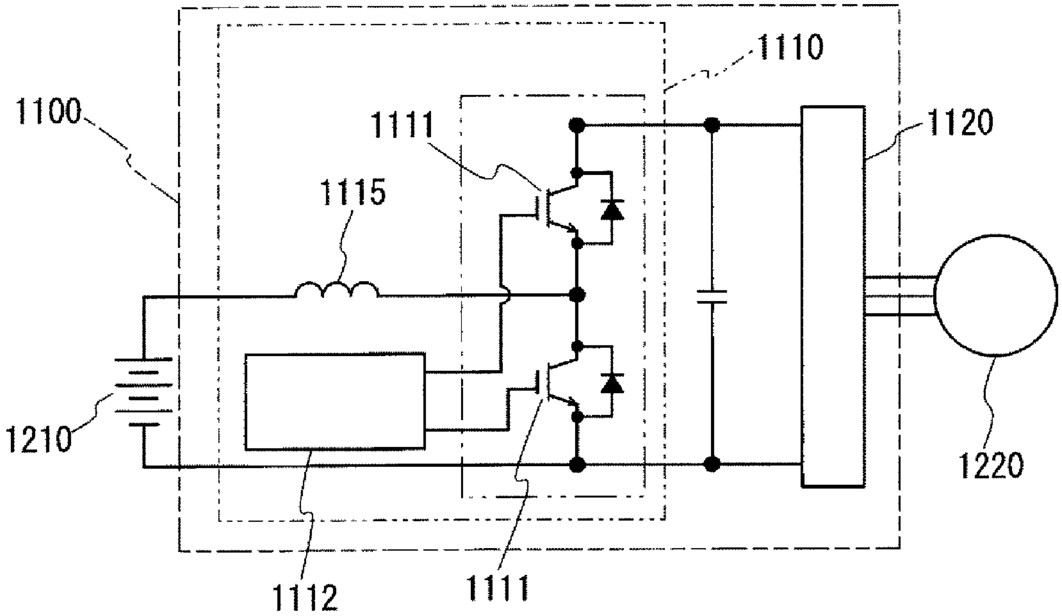
FIG. 6 is a circuit diagram schematically showing an example of a power conversion device that includes a converter.

As shown in FIG. 6, the converter 1110 includes a plurality of switching elements 1111, a drive circuit 1112 that controls the operation of the switching elements 1111, and a reactor 1115, and performs conversion of an input voltage by repeated ON/OFF operations. Here, the conversion of the input voltage is stepping up and stepping down. Power devices such as field effect transistors or insulated gate bipolar transistors are used as the switching elements 1111. The reactor 1115 utilizes the property of a coil that attempts to prevent a change in the current flowing in the circuit to achieve a function of smoothing a change in the current when the current attempts to increase or decrease due to the switching operation. The reactor 1 according to any one of the first to third embodiments is provided as the reactor 1115. The power conversion device 1100, the converter 1110, or the like is lightweight and has excellent conversion efficiency due to including the reactor 1 that is lightweight and has excellent magnetic characteristics.

In addition to the converter 1110, the vehicle 1200 includes a power supply device converter 1150 connected to the main battery 1210, and an auxiliary power supply converter 1160 that is connected to a sub battery 1230 (power supply for accessories 1240) and the main battery 1210 and converts a high voltage from the main battery 1210 to a low voltage. The converter 1110 typically performs DC-DC conversion, whereas the power supply device converter 1150 and the auxiliary power supply converter 1160 typically perform AC-DC conversion. Some power supply device converters 1150 perform DC-DC conversion. The reactor of the power supply device converter 1150 and the auxiliary power supply converter 1160 has the same configuration as the reactor 1 of any one of the first to third embodiments, and the size, shape, and the like of the reactor can be changed appropriately. Also, the reactor 1 or the like of any one of the first to third embodiments can be used in a converter that performs conversion on input power but only performs stepping up or stepping down.

Tests

Test Example 1

In Test Example 1, the influence of the width W1 of the inward recessed portions 4 and 5 shown in FIG. 2 on the inductance and the total loss of the reactor 1 was investigated. Specifically, the reactor of Sample No. 1 not including the inward recessed portions 4 and 5 and the reactor 1 of Samples No. 2 to No. 6 including the inward recessed portions 4 and 5 were analyzed. The only difference between the reactor of Sample No. 1 and the reactor 1 of Samples No. 2 to No. 6 is the presence or absence of the inward recessed portions 4 and 5. Also, the only difference between the reactors of Samples No. 2 and No. 6 is the width W1 of the inward recessed portions 4 and 5. The dimensions of the main portions of the magnetic core 3 of each sample are as follows.

Sample No. 1

Does not include inward recessed portions 4 and 5

Length L of magnetic core 3: 70 mm

Width W of magnetic core 3=width W of first end core 31 and second end core 32: 75 mm Height H of magnetic core 3: 30 mm Length T0 of middle core 30 in Y direction: 30 mm.

Length T12 of middle core 30 in X direction: 46 mm

Lengths T1 and T2 of first end core 31 and second end core 32 in X direction: 12 mm Lengths T3 and T4 of first side core 33 and second side core 34 in Y direction: 11 mm Sample No. 2

Width W1 of inward recessed portion 4: 5 mm

The width W1 of the inward recessed portion 4 is 10% of the length T12 of the middle core 30 in the X direction.

Depth D1 of inward recessed portions 4 and 5: 2 mm

Length of inward recessed portions 4 and 5 in Z direction: 30 mm

Sample No. 3

Width W1 of inward recessed portions 4 and 5: 10 mm

The width W1 of the inward recessed portions 4 and 5 is 21% of the length T12 of the middle core 30 in the X direction.

Sample No. 4

Width W1 of inward recessed portions 4 and 5: 15 mm

The width W1 of the inward recessed portions 4 and 5 is 32% of the length T12 of the middle core 30 in the X direction.

Sample No. 5

Width W1 of inward recessed portions 4 and 5: 20 mm

The width W1 of the inward recessed portions 4 and 5 is 43% of the length T12 of the middle core 30 in the X direction.

Sample No. 6

Width W1 of inward recessed portions 4 and 5: 25 mm

The width W1 of the inward recessed portions 4 and 5 is 54% of the length T12 of the middle core 30 in the X direction.

The commercially available software JMAG-Designer 18.1 (manufactured by JSOL Corporation) was used to simulate the inductance and total loss of each sample. The inductance (μH) when a current was passed through the coil 2 was obtained in the inductance analysis. The current was changed in the range of 0 A to 300 A. Table 1 shows the inductance when the current value is 0 A, 100 A, 200 A, and 300 A. The inductance is shown as a percentage relative to an inductance of 100% for Sample No. 1 at 0 A.

In the total loss analysis, the total loss (W) was obtained based on the magnetic flux density distribution and the current density distribution when driven at a direct current of 0 A, an input voltage of 200 V, an output voltage of 400 V, and a frequency of 20 kHz. The total loss in this example includes iron loss of the magnetic core 3, coil loss, and the like. The results are shown in Table 1. The total loss and coil loss are shown as a percentage relative to a total loss of 100% for Sample No. 1.

Table 1 also shows the volume reduction amount ($mm^3$) of the magnetic core 3 due to the provision of the inward recessed portion 4.

portions 4 and 5 increases, the inductance of the reactor 1 at 200 A or 300 A tends to increase.

On the other hand, it was found that the total loss in the reactor 1 was reduced by providing the inward recessed portions 4 and 5. In particular, the reduction in coil loss due to the provision of the inward recessed portions 4 and 5 was remarkable.

Furthermore, in order to investigate the relationship between the width W1 of the inward recessed portions 4 and 5 and the extent of change in the coil loss in the reactor 1, the amount of decrease of coil loss and the rate of decrease of coil loss were investigated as shown below.

Amount of Decrease of Coil Loss (amount of decrease of coil loss)=(coil loss of base model)−(coil loss of target model)

For example, the amount of decrease of coil loss of Sample No. 2 is obtained by subtracting the coil loss of Sample No. 2 from the coil loss of Sample No. 1 serving as the base model.

Figure 7:
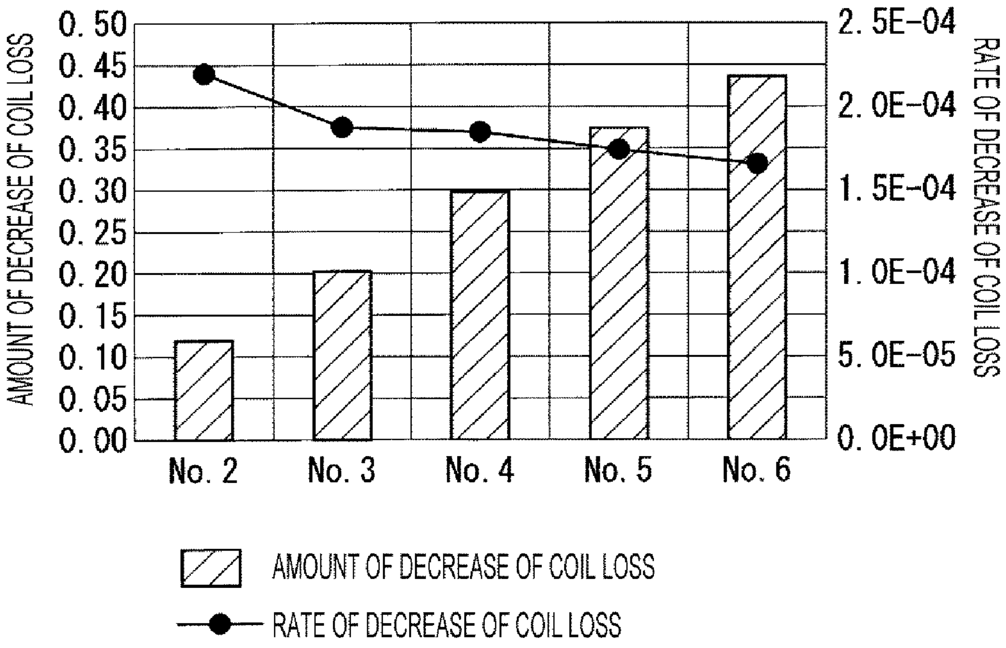
FIG. 7 is a graph showing the relationship between the width of an inward recessed portion and magnetic characteristics in Test Example 1.

The amount of decrease of coil loss of Samples No. 2 to No. 6 is shown in a bar graph in FIG. 7. The horizontal axis of the graph indicates the sample number, and the left vertical axis indicates the amount of decrease of coil loss (W).

Rate of Decrease of Coil Loss (rate of decrease of coil loss)=(amount of decrease of coil loss)/(volume reduction amount of magnetic core)

The rate of decrease of coil loss of Samples No. 2 to No. 6 is shown in a line graph in FIG. 7. The horizontal axis of the graph indicates the sample number, and the right vertical axis indicates the rate of decrease of coil loss. The vertical axis indicates numerical values obtained from raw data.

It was found that, as shown in the line graph in FIG. 7, as the width W1 of the inward recessed portions 4 and 5 increases, the rate of decrease of coil loss gradually decreases, but the amount of decrease of coil loss shown in the bar graph increases. As shown in Table 1, as the width W1 of the inward recessed portions 4 and 5 increases, the total loss of the entire reactor 1 decreases, and thus it was found that it is preferable that the width W1 of the inward recessed portions 4 and 5 is 20 mm or more and 25 mm or less.

TABLE 1

| Item | | Unit | Sample No. | | | | | |
|---|---|---|---|---|---|---|---|---|
| | | | No. 1 | No. 2 | No. 3 | No. 4 | No. 5 | No. 6 |
| Width W1 of inward recessed portion | | mm | 0 | 5 | 10 | 15 | 20 | 25 |
| Inductance | 0 A | % | 100 | 99.30 | 98.89 | 98.51 | 98.10 | 97.70 |
| | 100 A | | 79.43 | 79.11 | 78.89 | 78.70 | 78.47 | 78.27 |
| | 200 A | | 55.71 | 55.77 | 55.81 | 55.84 | 55.87 | 55.89 |
| | 300 A | | 33.42 | 33.53 | 33.61 | 33.68 | 33.81 | 34.00 |
| Total loss | | % | 100 | 99.69 | 99.45 | 99.15 | 98.91 | 98.75 |
| Coil loss | | % | 45.36 | 44.95 | 44.65 | 44.32 | 44.05 | 43.83 |
| Volume reduction | | $mm^3$ | — | 600 | 1200 | 1800 | 2400 | 3000 |

As shown in Table 1, compared with the reactor of Sample No. 1 serving as the base model, as the width W1 of the inward recessed portions 4 and 5 increases and as the volume reduction amount of the magnetic core 3 increases, the inductance of the reactor 1 at 0 A or 100 A tends to decrease. However, as the width W1 of the inward recessed

Test Example 2

In Test Example 2, the influence of the depth D1 of the inward recessed portions 4 and 5 shown in FIG. 2 on the inductance and the total loss of the reactor 1 was investigated. Specifically, the reactor of Sample No. 1 not including the inward recessed portions 4 and 5 and the reactor 1 of Samples No. 7 to No. 11 including the inward recessed portions 4 and 5 were analyzed. The reactor of Sample No. 1 is the same as the reactor of Sample No. 1 of Test Example 1. The only difference between the reactor 1 of Samples No. 7 to No. 11 is the depth D1 of the inward recessed portions 4 and 5. The dimensions of the main portions of the magnetic core 3 of each sample are as follows.

Sample No. 7

Depth D1 of inward recessed portions 4 and 5: 1 mm

The depth D1 of the inward recessed portions 4 and 5 is 9% of the lengths T3 and T4 of the side cores 33 and 34 in the Y direction.

Width W1 of inward recessed portions 4 and 5: 10 mm

Length of inward recessed portions 4 and 5 in Z direction: 30 mm

Sample No. 8

Depth D1 of inward recessed portion 4: 2 mm

The depth D1 of the inward recessed portions 4 and 5 is 18% of the lengths T3 and T4 of the side cores 33 and 34 in the Y direction.

Sample No. 9

Depth D1 of inward recessed portions 4 and 5: 3 mm

The depth D1 of the inward recessed portions 4 and 5 is 27% of the lengths T3 and T4 of the side cores 33 and 34 in the Y direction.

Sample No. 10

Depth D1 of inward recessed portions 4 and 5: 4 mm

The depth D1 of the inward recessed portions 4 and 5 is 36% of the lengths T3 and T4 of the side cores 33 and 34 in the Y direction.

Sample No. 11

Depth D1 of inward recessed portions 4 and 5: 5 mm

The depth D1 of the inward recessed portions 4 and 5 is 45% of the lengths T3 and T4 of the side cores 33 and 34 in the Y direction.

The inductance and total loss of each sample were determined by the same method as in Test Example 1. The results are shown in Table 2.

TABLE 2

| Item | | Unit | Sample No. | | | | | |
|---|---|---|---|---|---|---|---|---|
| | | | No. 1 | No. 7 | No. 8 | No. 9 | No. 10 | No. 11 |
| Depth D1 of inward recessed portion | | mm | 0 | 1 | 2 | 3 | 4 | 5 |
| Inductance | 0 A | % | 100 | 99.57 | 98.89 | 98.06 | 97.08 | 95.95 |
| | 100 A | | 79.43 | 79.22 | 78.89 | 78.49 | 78.02 | 77.48 |
| | 200 A | | 55.71 | 55.75 | 55.81 | 55.87 | 55.93 | 55.99 |
| | 300 A | | 33.42 | 33.48 | 33.61 | 33.80 | 34.20 | 34.58 |
| Total loss | | % | 100 | 99.71 | 99.45 | 99.25 | 99.22 | 99.33 |
| Coil loss | | % | 45.36 | 45.01 | 44.65 | 44.37 | 44.24 | 44.26 |
| Volume reduction | | $mm^3$ | — | 600 | 1200 | 1800 | 2400 | 3000 |

As shown in Table 2, compared with the reactor of Sample No. 1 serving as the base model, as the depth D1 of the inward recessed portions 4 and 5 increases, that is to say as the volume reduction amount of the magnetic core 3 increases, the inductance of the reactor 1 at 0 A or 100 A tends to decrease. However, as the depth D1 of the inward recessed portions 4 and 5 increases, the inductance of the reactor 1 at 200 A or 300 A tends to increase.

On the other hand, it was found that the total loss in the reactor 1 was reduced by providing the inward recessed portions 4 and 5. In particular, the reduction in coil loss due to the provision of the inward recessed portions 4 and 5 was remarkable.

Figure 8:
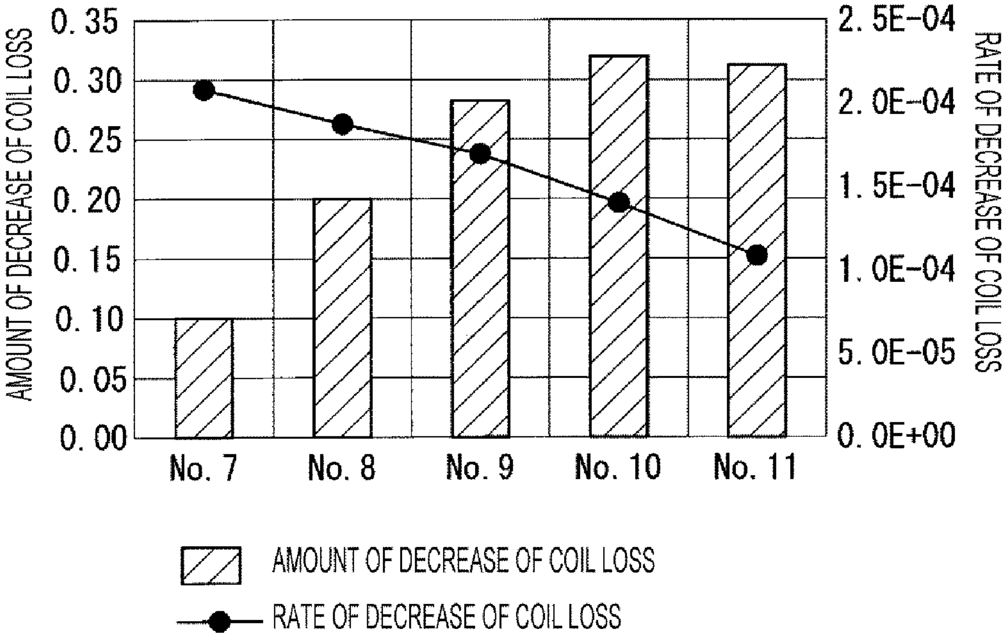
FIG. 8 is a graph showing the relationship between the depth of the inward recessed portion and magnetic characteristics in Test Example 1.

Furthermore, in order to investigate the relationship between the depth D1 of the inward recessed portions 4 and 5 and the extent of change in coil loss in the reactor 1, the amount of decrease and the rate of decrease of coil loss of the samples were investigated. The definitions of the amount of decrease and the rate of decrease of coil loss are the same as the definitions of the amount of decrease and the rate of decrease of coil loss in Test Example 1. The results are shown in FIG. 8. FIG. 8 is viewed likewise to FIG. 7.

As shown in the line graph of FIG. 8, as the depth D1 of the inward recessed portions 4 and 5 increases, the rate of decrease of coil total loss decreases sharply. Also, the amount of decrease of coil loss shown in the bar graph peaks in Sample No. 10 but is rather low in Sample No. 11. In fact, as shown in Table 2, the total loss of the reactor 1 was also small in Sample No. 11. Accordingly, it was found that it is preferable that the depth D1 of the inward recessed portions 4 and 5 is 3 mm or more and 4 mm or less.

Test Example 3

In Test Example 3, it was investigated whether the rate of decrease in magnetic characteristics due to the provision of the inward recessed portions 4 and 5 is different according to whether the magnetic core 3 is a powder compact or a composite material. The characteristics of the samples are as follows. The dimensions L, W, H, TO, T1, T2, T3, and T4 of the magnetic core 3 of each sample are the same as in Sample No. 1 of Test Example 1.

Sample No. 20

Entirety of magnetic core 3 is powder compact.

Does not include inward recessed portions 4 and 5.

Sample No. 21

Entirety of magnetic core 3 is powder compact.

Includes inward recessed portions 4 and 5.

Width W1 of inward recessed portions 4 and 5: 12 mm

Depth D1 of inward recessed portions 4 and 5: 4 mm

Sample No. 22

Entirety of magnetic core 3 is composite material.

Does not include inward recessed portions 4 and 5.

Sample No. 23

Entirety of magnetic core 3 is composite material.

Includes inward recessed portions 4 and 5.

Width W1 of inward recessed portions 4 and 5: 12 mm

Depth D1 of inward recessed portions 4 and 5: 4 mm

The inductance and the total loss of Samples No. 20 to No. 23 were measured. The measurement method is the same as in Test Example 1. The measurement results are shown in Table 3. The inductance in Table 3 is shown as a percentage relative to an inductance of 100% for Sample No. 20 at 0 A. The total loss in Table 3 is shown as a percentage relative to a total loss of 100% for Sample No. 20. In the columns for Sample No. 21 and Sample No. 23 in Table 3, the rates of change relative to Sample No. 20 and Sample No. 22 are shown as a percentage in parentheses. When the rate of change in inductance is positive, it can be considered that the magnetic characteristics of the reactor 1 have improved. When the rate of change in total loss is negative, it can be considered that the magnetic characteristics of the reactor 1 have improved.

TABLE 3

| Item | | Unit | Sample No. | | | |
|---|---|---|---|---|---|---|
| | | | No. 20 | No. 21 | No. 22 | No. 23 |
| Inductance | 0 A | % | 100 | 98.57 (−1.4%) | 12.99 | 12.90 (−0.8%) |
| | 100 A | | 12.97 | 13.14 (+1.3%) | 10.95 | 10.91 (−0.6%) |
| | 200 A | | 7.16 | 7.26 (+1.3%) | 8.64 | 8.64 (−0.2%) |
| | 300 A | | 3.69 | 3.73 (+1.1%) | 6.19 | 6.23 (+0.4%) |
| Total loss | | % | 100 | 101.40 (+1.4%) | 104.62 | 103.80 (−0.8%) |

As shown in Table 3, the total loss is low in Sample No. 23, in which the magnetic core 3 is made of a composite material. On the other hand, the total loss is high in Sample No. 21, in which the magnetic core 3 is a powder compact. From the viewpoint of reducing the total loss, in the case where the inward recessed portions 4 and 5 are provided in the side cores 33 and 34, it is preferable that the side cores 33 and 34 are made of a composite material.

LIST OF REFERENCE NUMERALS

1 reactor
2 coil
21 first winding portion, 2*a*, 2*b* end portion
211 first end face, 212 second end face
213 first side face, 214 second side face
3 magnetic core
3*g* gap portion
3A first core piece, 3B second core piece, 3C third core piece, 3D fourth core piece
30 middle core, 31 first end core, 32 second end core
33 first side core, 34 second side core
330, 340 inward face
4 inward recessed portion
40 bottom face, 41, 42 inner wall face
5 inward recessed portion
1100 power conversion device
1110 converter, 1111 switching element, 1112 drive circuit
1115 reactor, 1120 inverter
1150 power supply device converter, 1160 auxiliary power supply converter
1200 vehicle
1210 main battery, 1220 motor, 1230 sub battery
1240 accessory, 1250 wheel
1300 engine
D1 depth
H height
L, T0, T1, T2, T3, T4, T12 length
W, W1 width

What is claimed is:

1. A reactor comprising:
a coil including a first winding portion; and
a magnetic core,
wherein the magnetic core includes:
a middle core arranged inside the first winding portion,
a first end core facing a first end face of the first winding portion,
a second end core facing a second end face of the first winding portion,
a first side core that is arranged outward of a first side face of the first winding portion and connects the first end core and the second end core, and
a second side core that is arranged outward of a second side face of the first winding portion and connects the first end core and the second end core,
at least one of the first side core and the second side core includes an inward recessed portion provided in an inward face that faces the first winding portion in a Y direction,
in a plan view of the magnetic core from a Z direction, at least a portion of the inward recessed portion is overlapped with a range corresponding to a length of the first winding portion in an X direction,
in a plan view of the magnetic core from the Z direction, the width of the inward recessed portion in the X direction is 43% or more and 54% or less of a length of the middle core in the X direction, and the depth of the inward recessed portion in the Y direction is 27% or more and 36% or less of a length of the first side core or the second side core in the Y direction,
the X direction is a direction conforming to an axial direction of the middle core,
the Y direction is a direction in which the middle core, the first side core, and the second side core are side-by-side,
the Z direction is a direction orthogonal to the X direction and the Y direction, and wherein the first side core and the second side core are each a compact made of a composite material in which a soft magnetic powder is dispersed in a resin,
wherein the magnetic core comprises a plurality of core pieces combined together, wherein at least one of the core pieces constitutes the middle core and is a powder compact formed by pressure molding a raw material powder containing the soft magnetic powder.

2. The reactor according to claim 1,
wherein the first side core and the second side core each include the inward recessed portion.

3. The reactor according to claim 1,
wherein in a plan view of the magnetic core from the Z direction, the inward recessed portion fits in the range corresponding to the length of the first winding portion in the X direction.

4. The reactor according to claim 1,
wherein the inward recessed portion is shaped as a groove extending along the Z direction.

5. The reactor according to claim 4,
wherein a cross-section of the inward recessed portion orthogonal to the Z direction has a rectangular shape.

6. A converter comprising the reactor according to claim 1.

7. A power conversion device comprising the converter according to claim 6.

8. The reactor according to claim 1, wherein the magnetic core is a combination of at least a first core piece and a second core piece, wherein a sum of a length of a portion of the first core piece corresponding to the middle core in the X direction and a length of a portion of the second core piece corresponding to the middle core in the X direction is shorter than a length of the first side core in the X direction, such that a gap portion is formed between the first core piece and the second core piece inside the first winding portion.

9. The reactor according to claim 1, wherein the composite material of the first side core and the second side core has a relative magnetic permeability of 5 or more and 50 or less, and wherein the powder compact of the middle core has a relative magnetic permeability of 50 or more and 500 or less.

* * * * *